(12) United States Patent
Yong et al.

(10) Patent No.: US 10,718,922 B2
(45) Date of Patent: Jul. 21, 2020

(54) OPTOELECTRONIC MODULE INCLUDING LENS BARREL COMPRISING FLANGES AND ADHESIVE THEREON AND RESTING DIRECTLY ON A COVER GLASS

(71) Applicant: ams Sensors Singapore Pte. Ltd., Singapore (SG)

(72) Inventors: Ahn Tae Yong, Singapore (SG); Sai Mun Chan, Singapore (SG); Kyu Won Hwang, Singapore (SG)

(73) Assignee: ams Sensors Singapore Pte. Ltd., Singapore (SG)

( * ) Notice: Subject to any disclaimer, the term of this patent is extended or adjusted under 35 U.S.C. 154(b) by 124 days.

(21) Appl. No.: 15/607,885

(22) Filed: May 30, 2017

(65) Prior Publication Data

US 2017/0351049 A1 Dec. 7, 2017

Related U.S. Application Data

(60) Provisional application No. 62/343,975, filed on Jun. 1, 2016.

(51) Int. Cl.
| | | |
|---|---|---|
| *G02B 7/02* | (2006.01) | |
| *G01J 1/04* | (2006.01) | |
| *G01J 1/02* | (2006.01) | |
| *G01J 1/42* | (2006.01) | |

(52) U.S. Cl.
CPC .......... *G02B 7/025* (2013.01); *G01J 1/0209* (2013.01); *G01J 1/0252* (2013.01); *G01J 1/0271* (2013.01); *G01J 1/0403* (2013.01); *G01J 1/0411* (2013.01); *G01J 1/42* (2013.01); *G02B 7/021* (2013.01); *G02B 7/022* (2013.01)

(58) Field of Classification Search
CPC .......... G02B 7/02; G02B 7/025; G02B 7/021; G02B 7/003; G02B 23/2484; G02B 7/022; G01J 1/0403; G01J 1/04; G01J 1/0411; G01J 1/0252; G01J 1/0209; G01J 1/0271; G01J 1/42; H01L 27/14618; H01L 27/14625; H04N 5/2254; H04N 5/2253; H04N 5/2252

See application file for complete search history.

(56) References Cited

U.S. PATENT DOCUMENTS

| | | | | |
|---|---|---|---|---|
| 6,483,101 | B1 * | 11/2002 | Webster | ................... G02B 7/02 250/216 |
| 6,686,588 | B1 * | 2/2004 | Webster | ................. H01L 24/97 250/216 |
| 2004/0189862 | A1 * | 9/2004 | Gustavsson | ........ G02B 13/0015 348/376 |

(Continued)

FOREIGN PATENT DOCUMENTS

| | | |
|---|---|---|
| KR | 100801642 B1 * | 2/2008 |
| WO | WO 2015/126328 | 8/2015 |
| WO | WO 2016/013978 | 1/2016 |

*Primary Examiner* — Que Tan Le
*Assistant Examiner* — Jennifer D Bennett
(74) *Attorney, Agent, or Firm* — Michael Best and Friedrich LLP

(57) ABSTRACT

The present disclosure describes subassemblies and optoelectronic modules in which an optics system, or a spacer laterally surrounding a cover glass, includes a flange which facilitates mechanical attachment of the optics system to the spacer.

22 Claims, 6 Drawing Sheets

(56) References Cited

U.S. PATENT DOCUMENTS

2015/0048386 A1* 2/2015 Hsu .................. H01L 31/12
  257/82
2016/0165125 A1* 6/2016 Kim .................. G03B 3/10
  348/345

* cited by examiner

OPTOELECTRONIC MODULE INCLUDING LENS BARREL COMPRISING FLANGES AND ADHESIVE THEREON AND RESTING DIRECTLY ON A COVER GLASS

CROSS-REFERENCE TO RELATED APPLICATION(S)

This application claims the benefit of priority of U.S. Provisional Patent Application No. 62/343,975, filed on Jun. 1, 2016. The contents of the earlier application are incorporated herein by reference in their entirety.

FIELD OF THE DISCLOSURE

The present disclosure relates to optoelectronic modules that include a lens barrel.

BACKGROUND

Optoelectronic modules can be integrated into a wide range of small electronic devices, such as surveillance cameras, camcorders, laptop computers, tablet computers, bio devices, and mobile robots, among others. Such modules may include, for example, an image sensor to capture images. Light entering through an aperture at one end of the module can be directed to the image sensor by an optical system such as one or more passive optical elements (e.g., lenses) disposed in a lens barrel.

In some cases, the lens barrel is mounted by adhesive to a cover glass that is disposed over the image sensor. Such configurations, however, can suffer mechanical problems during thermal cycling. For example, at elevated temperatures, the lens barrel may expand significantly compared to the cover glass. Consequently, the lens barrel may experience significant thermal stresses and, in some instances, the optical elements disposed within the lens barrel may experience significant thermal stresses. During thermal cycling, the thermal stresses can cause mechanical failure in the optoelectronic module such as delamination or cracking of the adhesive or of a component within the optoelectronic module.

SUMMARY

The present disclosure describes subassemblies and optoelectronic modules in which an optics system, or a spacer laterally surrounding a cover glass, includes a flange which facilitates mechanical attachment of the optics system to the spacer.

For example, in one aspect, a subassembly includes a cover glass that is transparent to a particular wavelength or range of wavelengths. One or more passive optical elements are disposed in a holder having a base that sits directly on the cover glass. A spacer laterally surrounds and encapsulates an edge of the cover glass. At least one of the holder or the spacer has a flange. Adhesive on the flange fixes the holder to the spacer.

According to another aspect, an optoelectronic module includes an optoelectronic device operable to generate radiation of a particular wavelength or range of wavelengths, or operable to generate signals in response to sensing radiation of the particular wavelength or range of wavelengths. A cover glass is disposed over the optoelectronic device and is transparent to the particular wavelength or range of wavelengths. One or more passive optical elements are disposed in a holder having a base that sits directly on the cover glass. A spacer laterally surrounds and encapsulates an edge of the cover glass. At least one of the holder or the spacer has a flange. Adhesive on the flange fixes the holder to the spacer.

Some implementations include one or more of the following features. For example, the flange can include one or more grooves. In some cases, the flange is contiguous with the holder and may include one or more grooves along its edge. The holder can be, for example, a lens barrel, in which the one or more passive optical elements include a lens. In some instances, the flange is contiguous with the spacer, and may include one or more grooves along its edge. In some instances, there is a first flange on the holder and a second flange on the spacer, wherein adhesive on the first and second flanges fixes the holder to the spacer. In some implementations, the flanges are composed of a material that is opaque to the particular wavelength or range of wavelengths.

In various implementations, the optoelectronic device can include an image sensor or a light emitter. Thus, the techniques described here can be incorporated, for example, into modules arranged to sense radiation of a particular wavelength or range of wavelengths, as well as modules arranged to emit radiation of a particular wavelength or range of wavelengths.

Some implementations provide one or more of the following advantages. For example, the configurations described here can help provide mechanical stability and a light-tight seal. Thermal stresses can, in some cases, be reduced, thereby reducing the likelihood of a mechanical failure such as delamination or cracking of adhesive.

Other aspects, features and advantages will be readily apparent from the following detailed description, the accompanying drawings, and the claims.

DETAILED DESCRIPTION

The present disclosure describes optoelectronic modules in which a portion of an optics system sits directly on a cover glass (e.g., without intervening adhesive between the optics system and the cover glass). The optics system or a spacer laterally surrounding the cover glass includes a flange where adhesive is provided so as to attach the optics system to the spacer, thereby providing mechanical stability and a light-tight seal. In some instances, both the optics system and the spacer include such a flange.

Figure 1:
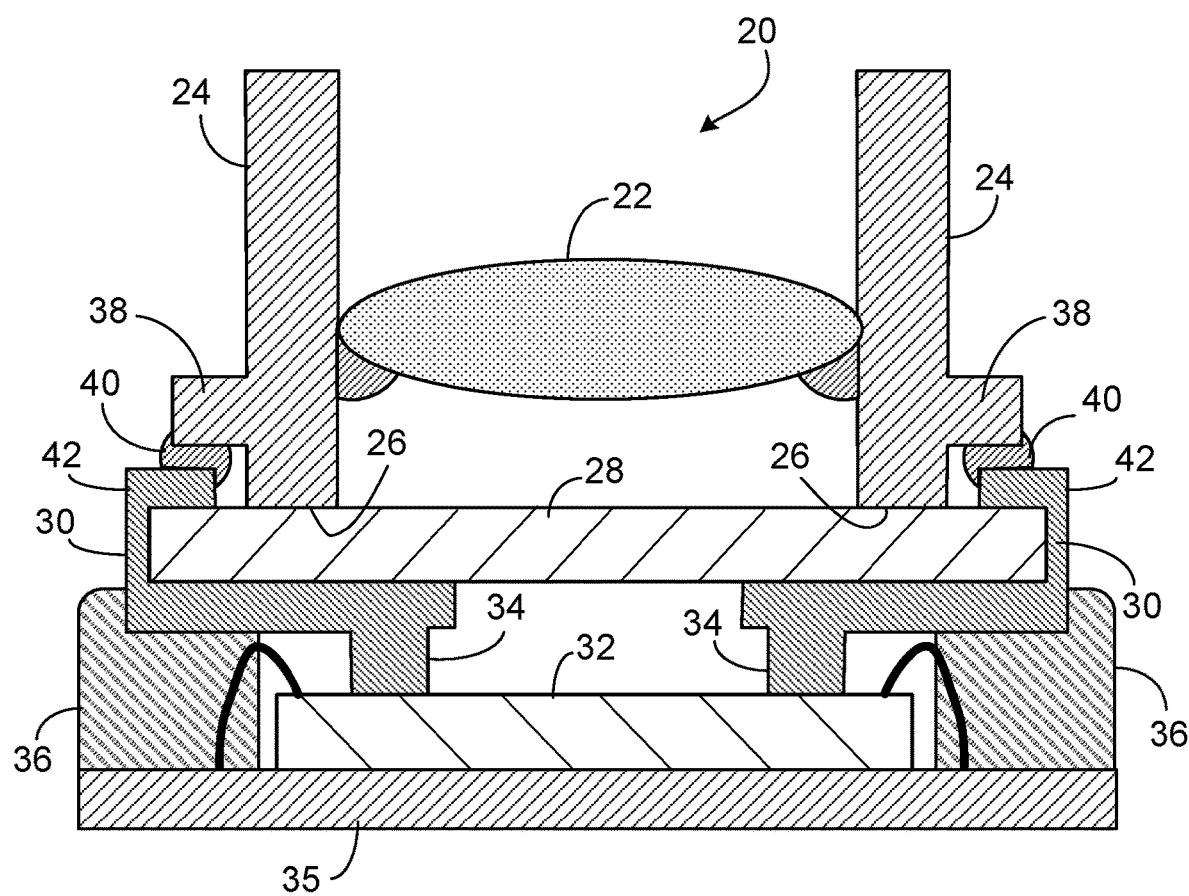
FIG. 1 illustrates an example of an optoelectronic module.

As shown in FIG. 1, an optoelectronic module 20 includes an optics system that comprises one or more passive optical elements (e.g., lenses) 22 disposed in a cylindrical holder (e.g., a lens barrel) 24. The base 26 of the lens barrel 24 sits directly on a cover glass 28 (e.g., without any intervening adhesive). Thus, the base 26 of the lens barrel 24 is in direct contact with the cover glass 28. The cover glass 28 is substantially transparent at least to a particular wavelength or range of wavelengths of radiation. In some cases, the cover glass 28 includes one or more optical filter layers, such as an infra-red (IR)-cut filter layer. Thus, in some cases, the base 26 of the lens barrel 24 sits directly on an optical filter layer of the cover glass 28.

A spacer 30 laterally surrounds and encapsulates the circumferential edge of the cover glass 28. The spacer 30 also establishes a specified distance between the cover glass 28 and an active optoelectronic device such as an image sensor 32 disposed at the side of the cover glass 28 opposite that of the optical system 22, 24. The combination of the optical system 22, 24, the spacer 30 and the cover glass 28 form a subassembly that can be attached over the image sensor 32.

As shown in FIG. 1, vertical alignment features 34 of the spacer 30 project from the cover glass 28 and sit directly on the surface of the image sensor 32 (e.g., without any intervening adhesive). The image sensor 32, which includes active photosensitive regions (e.g., pixels) operable to generate signals in response to sensing received radiation (e.g., infra-red or visible light), can be mounted on a substrate such as a printed circuit board (PCB) 35. The spacer 30 can be fixed to the PCB 35, for example, by adhesive 36.

As further shown in FIG. 1, the lens barrel 24 has an annular flange 38 that laterally encircles the lens barrel 24 around its outer circumference. The flange 38 can be formed as a single piece such that it is contiguous with the lens barrel 24. In other cases, the flange 38 can be a separate piece that is attached to the lens barrel 24. To secure the lens barrel 24 in place, adhesive 40 is provided between the flange 38 and the upper portion 42 of the spacer 30. Once the adhesive 40 is cured, it fixes the lens barrel 24 to the spacer 30 that surrounds the cover glass 28. A mechanical connection is thus provided between the lens barrel 24 and the cover glass 28. This arrangement, in some instances, can provide various advantages. For example, even if changes in temperature cause the lens barrel 24 and/or lenses 22 to expand differently from the cover glass 28, thermal stresses can be reduced, thereby reducing the likelihood of a mechanical failure such as delamination or cracking of adhesive. Further, as the base 26 of the lens barrel 24 sits directly on a cover glass 28, the distance between the optical elements 22 and the cover glass 28 can be controlled more precisely.

Figure 2A:
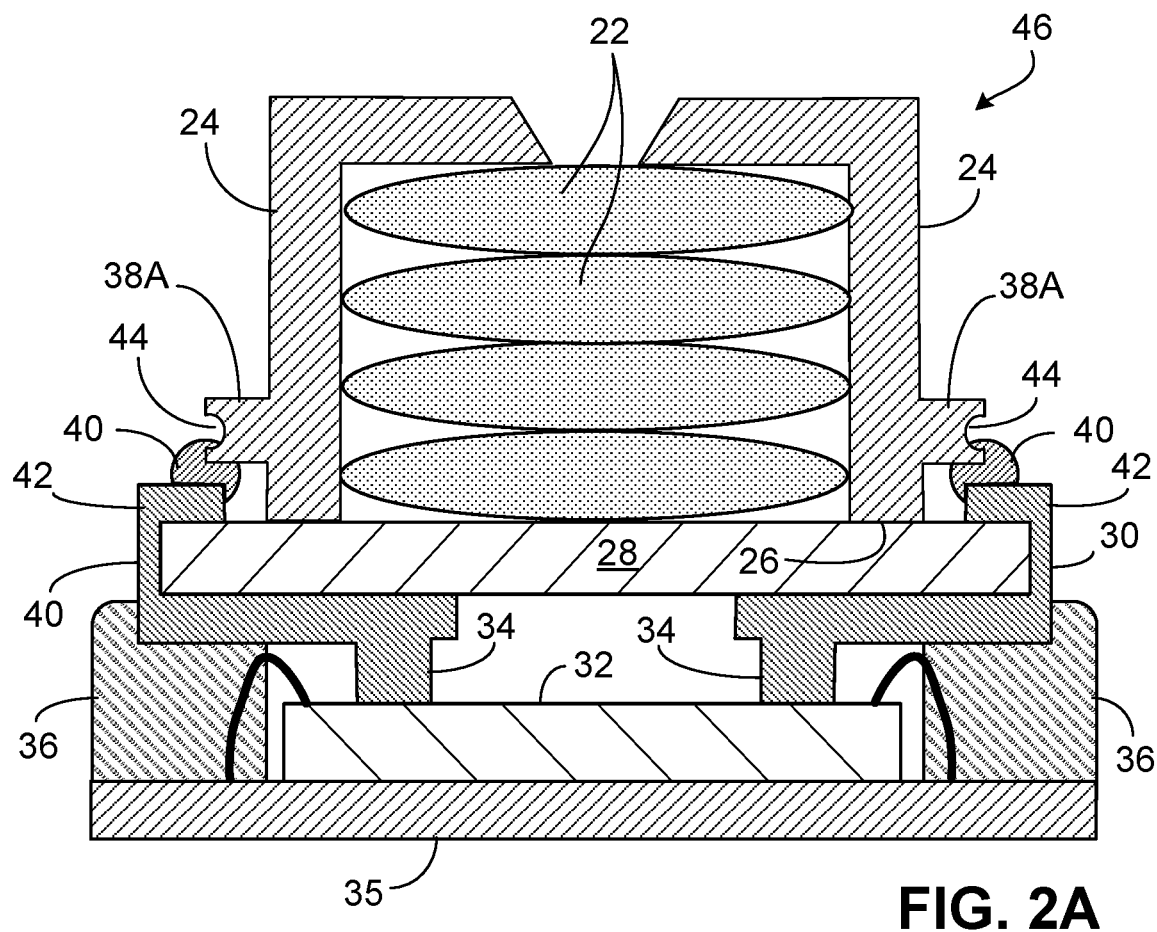
FIG. 2A illustrates another example of an optoelectronic module.
Figure 2B:
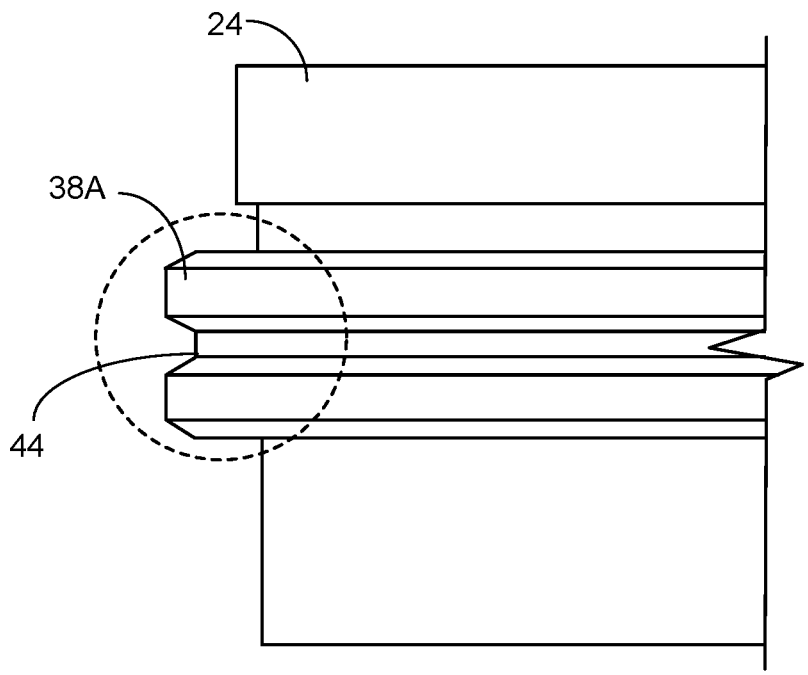
FIG. 2B illustrates further details of a flange in the optoelectronic module of FIG. 2A.

The lens barrel 24, flange 38 and spacer 30 can be composed, respectively, of materials that are substantially opaque (i.e., non-transparent) to wavelengths of light detectable by the image sensor 32. Examples of such materials include a flowable polymer material (e.g., epoxy, acrylate, polyurethane, or silicone) containing a non-transparent filler (e.g., carbon black, a pigment, an inorganic filler, or a dye). In such situations, the configuration of FIG. 1 can help provide a light-tight seal to prevent stray light from entering the sides of the module 20 and passing through the cover glass 28 to the image sensor 32. Further, the lens barrel 24, the lenses 22, the flange 38 and/or the spacer 30 can be composed, respectively, of materials having similar coefficients of expansion. Such configurations also can help reduce mechanical stresses that could lead to mechanical failure. In some implementations, the lens barrel 24, the lenses, 22 the flange 38 and/or the spacer 30 can be formed by vacuum or injection molding processes. In some implementations, the flange encircling the lens barrel 24 can be modified to help prevent unintended bonding of the lens barrel 24 and the cover glass 28 that might otherwise result from adhesive 40 flowing onto the cover glass in an area adjacent the base 26 of the lens barrel 24. Thus, for example, as shown in the module 46 FIGS. 2A and 2B, the 38A flange includes one or more grooves 44 along its outer circumference. In some cases, the grooves 44 can help wick away excess adhesive so that the adhesive does not flow too close to the cover glass 28. Such a configuration can be particularly advantageous, for example, where the uncured adhesive has low viscosity. The grooves 44 also can help enhance the mechanical connection between the lens barrel 24 and the spacer 30. For example, the greater surface area provided by the groove(s) 44 can result in a stronger bond between the lens barrel 24 and the spacer 30.

Figure 3:
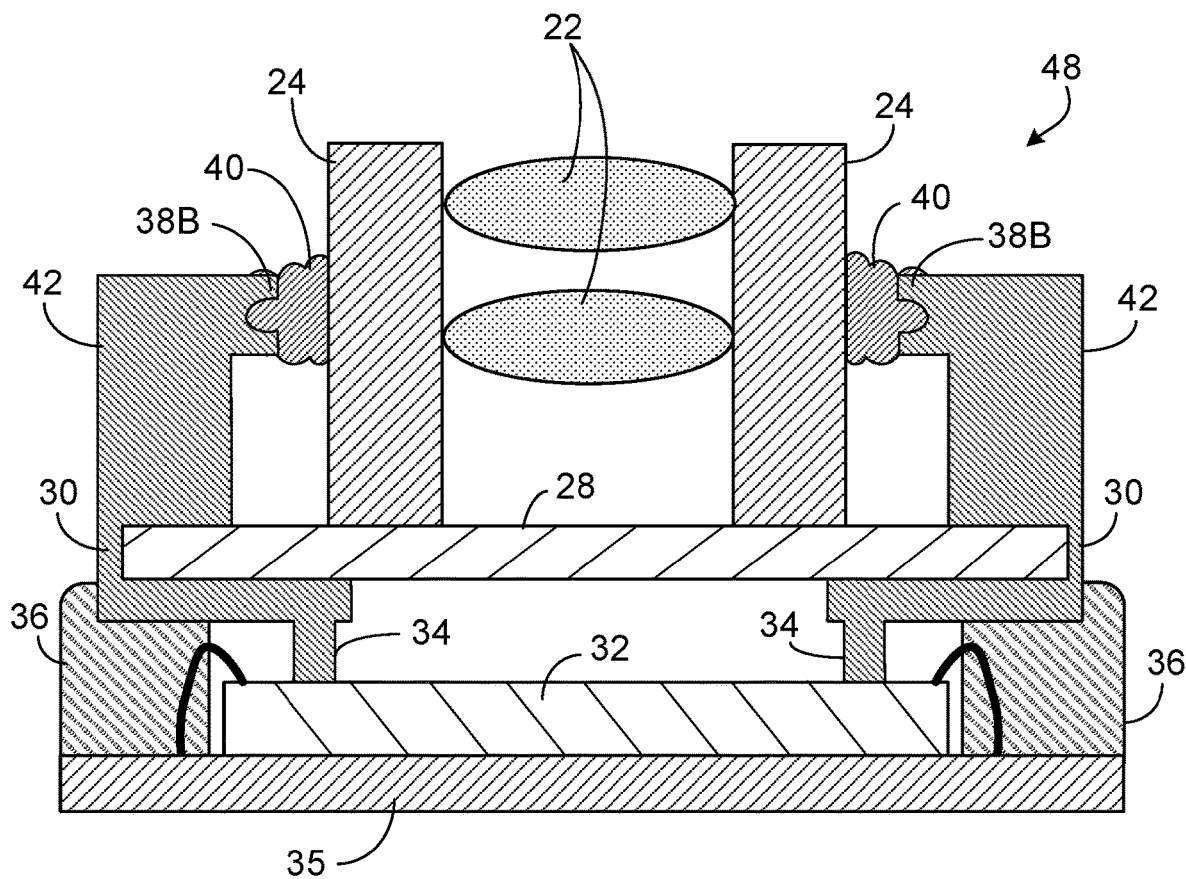
FIG. 3 illustrates a further example of an optoelectronic module.

In some implementations, instead of providing a flange 38 on the lens barrel or other holder 24 for the passive optical elements 22, an annular flange can be provided on an inner-facing surface at the upper portion 42 of the spacer 30. An example is illustrated in FIG. 3, which shows a module 48 that has a spacer 30 whose upper portion 42 includes a flange 38B on its inner surface facing the lens barrel 24. The flange 38B can be formed as a single piece that is of the same material as, and is contiguous with, the spacer 30. In other cases, the flange 3B can be a separate piece that is attached to the spacer 30.

Figure 4:
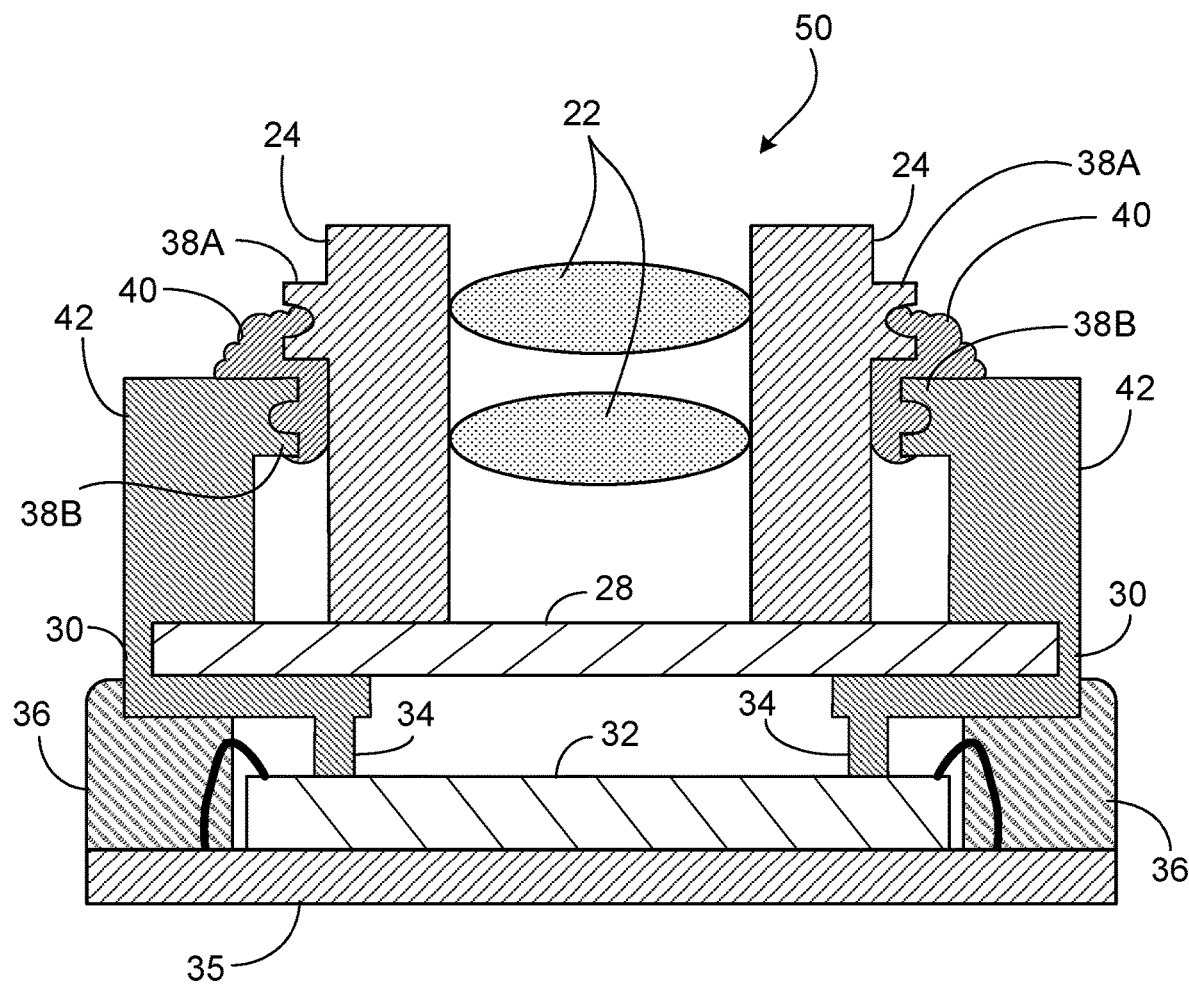
FIG. 4 illustrates yet another example of an optoelectronic module.

Some implementations, such as the module 50 of FIG. 4, include two flanges, a first flange 38A around the outer circumference of the lens barrel 24 and a second flange 38B at the inner surface of the spacer 30 facing the lens barrel 24. The two flanges 38A, 38B can be positioned near one another so that the adhesive 40 can be applied, for example, by jetting with a needle in the vicinity of both flanges. As in the other implementations, the adhesive can be cured (e.g., by UV radiation or thermally) so that the lens barrel 24 is fixed in place over the cover glass 28. One or both of the flanges 38A, 38B can have one or more grooves as described in connection with FIG. 2B.

Figure 5:
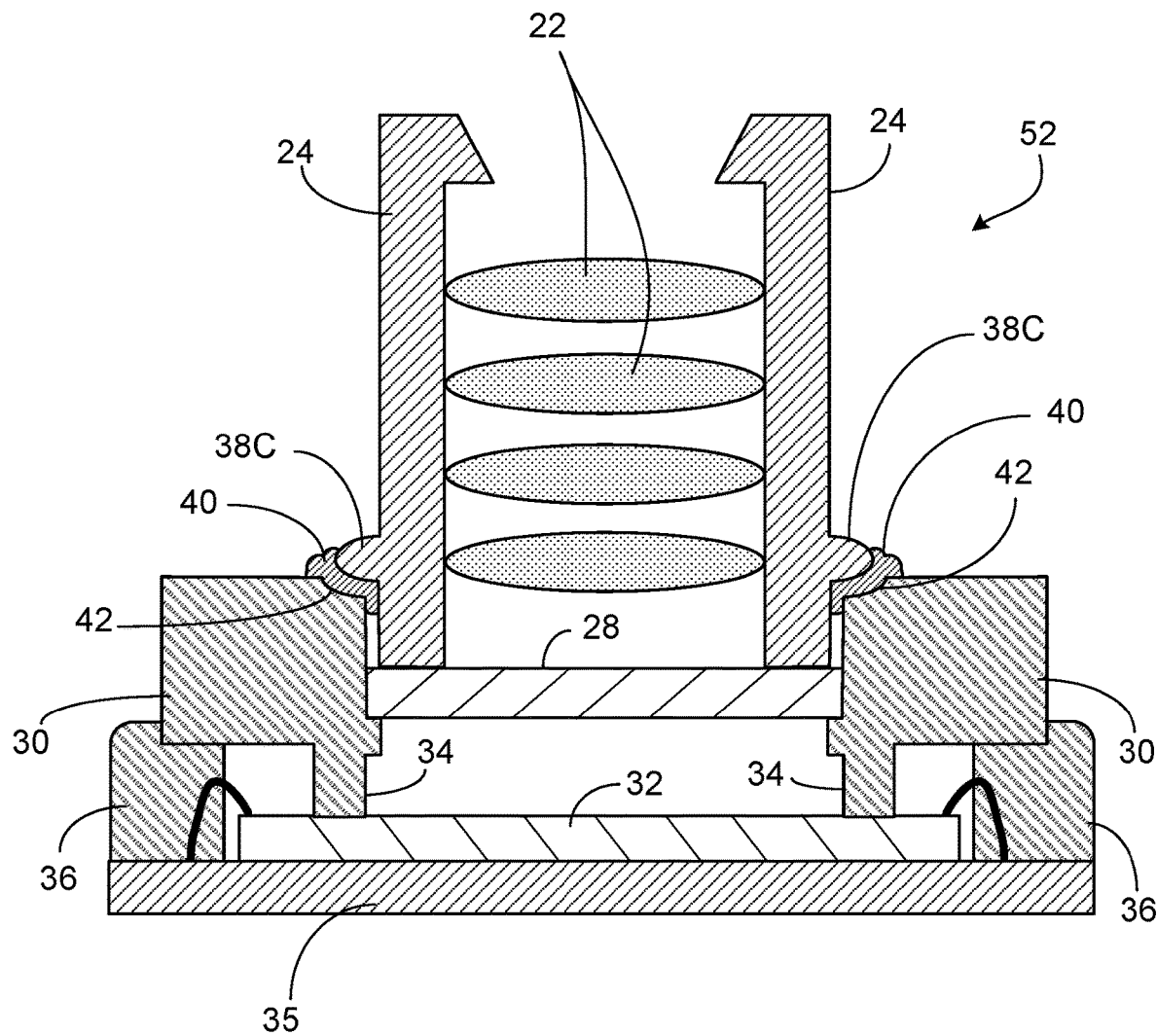
FIG. 5 illustrates another example of an optoelectronic module.

In some cases, the lens barrel 24 can have a flange whose shape mirrors the shape of upper portion of the spacer 30. FIG. 5 illustrates an example of a module 52 in which the lens barrel 24 has a flange 38C that is rounded so as to correspond to the opposing surface at the upper portion 42 of the spacer 30. Thus, in some instances, the flange can be shaped as an annular ring that fits within an annular indentation in the upper surface of the spacer.

Figure 6:
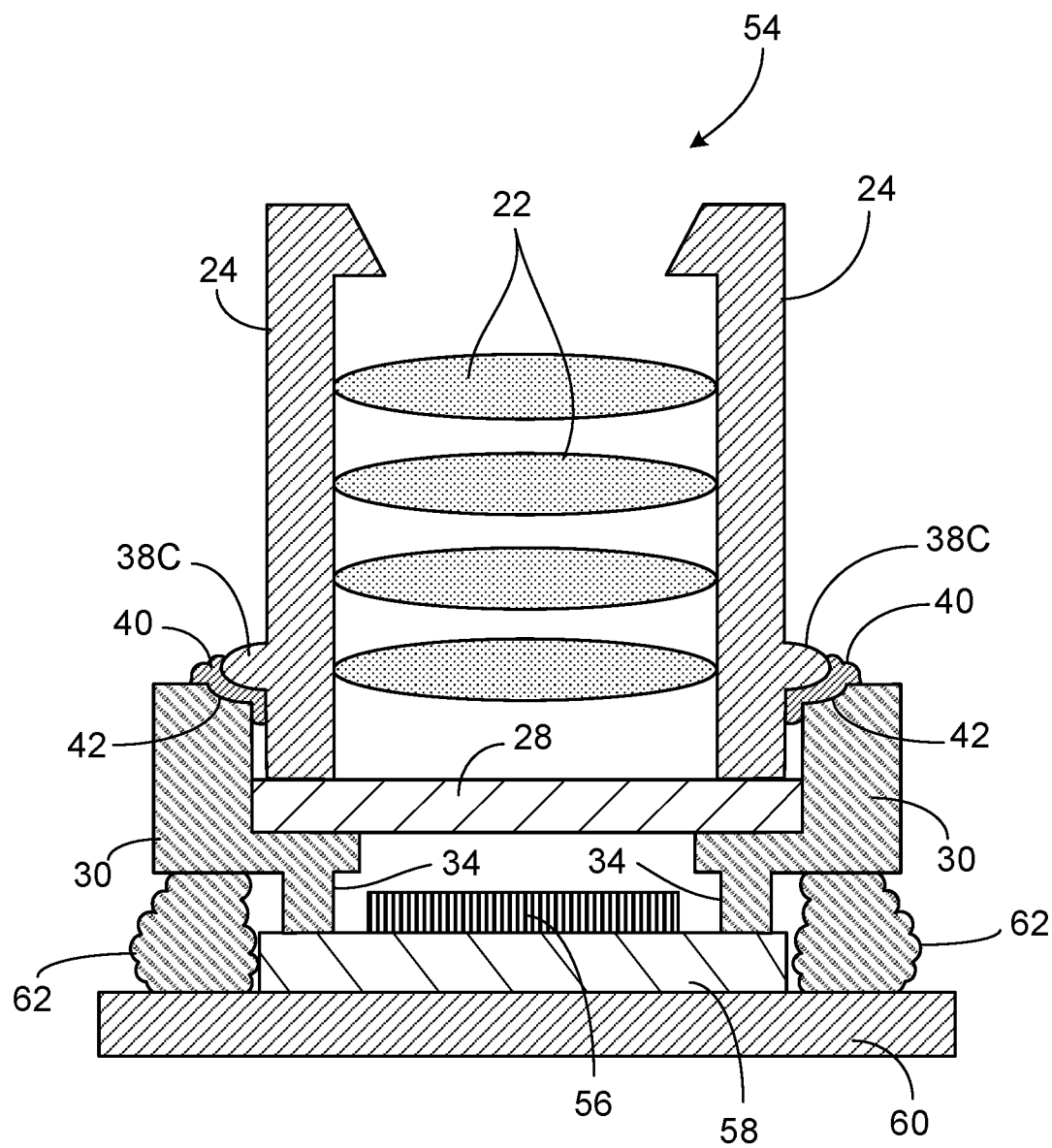
FIG. 6 illustrates a further example of an optoelectronic module.

Although the foregoing examples illustrate modules that include an image sensor, similar techniques can be used for modules that include other types of active optoelectronic devices such as light emitters. Thus, each of the modules illustrated above can be modified by replacing the image sensor 32 with a light emitter, such as a light emitting diode (LED), an infra-red (IR) LED, an organic LED (OLED), an infra-red (IR) laser, a vertical cavity surface emitting laser (VCSEL)), or an array of any of the foregoing light emitters (e.g., an array of VCSELs). FIG. 6 shows an example of a light emitting module 54 that includes a light emitter 56 mounted on a sub-mount sub-assembly. The sub-mount assembly can include, for example, a metal (e.g., copper) trace 58 on a sub-mount 60. The vertical alignment features 34 of the spacer 30 can sit directly (e.g., without any intervening adhesive) on the sub-mount assembly (e.g., the emitter-side of the metal trace 58). The spacer 30 also can be fixed to the sub-mount 60 by adhesive 62.

As previously described with respect to the image sensor modules, the light emitter module 54 includes a cover glass 28 having a circumferential edge that is laterally surrounded and encapsulated by the spacer 30. The spacer 30 also can establish a specified distance between the cover glass 28 and the light emitter 56.

As further illustrated in FIG. 6, the module 54 also includes an optics system that comprises one or more passive optical elements (e.g., lenses) 22 disposed, for example, in a cylindrical holder (e.g., a lens barrel) 24. The base 26 of the lens barrel 24 sits directly on the cover glass 28 (e.g., without any intervening adhesive). Thus, the base 26 of the lens barrel 24 is in direct contact with the cover glass 28. The cover glass 28 is substantially transparent at least to a particular wavelength or range of wavelengths of radiation (e.g., IR) that the light emitter 56 is operable to generate. As in the image sensor modules, the combination of the optical system 22, 24, the spacer 30 and the cover glass 28 of the light emitter module 54 form a subassembly that can be attached over the image sensor 32.

In some implementations, a light emitter module includes an optics system and spacer as described in connection with any of FIGS. 1, 2A-2B, 3 or 4. Thus, in various implementations, a light emitter module can include, for example, a flange that is contiguous with the holder 24 for the passive optical elements 22 or that is contiguous with the spacer 30. In some cases, the light emitter may include a first flange on the holder 24 and a second flange on the spacer 30, as described above. In some instances, the flange includes one or more grooves along its edge and can be composed of a material that is opaque to the particular wavelength or range of wavelengths emitted by the light emitter 56.

Other implementations are within the scope of the claims.

What is claimed is:

1. A subassembly comprising:
   a cover glass that is transparent to a particular wavelength or range of wavelengths;
   one or more passive optical elements disposed in a holder having a base that sits directly on the cover glass;
   a spacer laterally surrounding and encapsulating an edge of the cover glass;
   a first flange on the holder and a second flange on the spacer, the first flange projecting outwardly in a first direction away from the one or more passive optical elements to provide a first protruding portion, the second flange projecting inwardly in a second direction toward the one or more passive optical elements to provide a second protruding portion,
   wherein the first flange has at least one first groove in the first protruding portion,
   wherein the second flange has at least one second groove in the second protruding portion, and
   wherein adhesive is present on the first and second flanges, including in the at least one first groove and the at least one second groove, and on a portion of the holder and a portion of the spacer adjacent to the at least one first groove and at least one second groove, which fixes the holder to the spacer.

2. The subassembly of claim 1 wherein at least one of the first or second flanges includes a plurality of grooves.

3. The subassembly of claim 1 wherein the first flange is contiguous with the holder.

4. The subassembly of claim 3 wherein the first flange includes one or more grooves along its edge.

5. The subassembly of claim 1 wherein the holder is a lens barrel, and wherein the one or more passive optical elements include a lens.

6. The subassembly of claim 1 wherein the second flange is contiguous with the spacer.

7. The subassembly of claim 6 wherein the second flange includes one or more grooves along its edge.

8. The subassembly of claim 1 wherein at least one of the first or second flanges is composed of a material that is opaque to the particular wavelength or range of wavelengths.

9. The subassembly of claim 1, wherein the holder and the spacer are non-contiguous.

10. The subassembly of claim 1, wherein the holder and the spacer have a longitudinal axis along a main optical axis of the one or more passive optical elements and have an area of overlap in the longitudinal direction; and wherein the holder and the spacer define an annulus extending along said area of overlap.

11. An optoelectronic module comprising:
    an optoelectronic device operable to generate radiation of a particular wavelength or range of wavelengths, or operable to generate signals in response to sensing radiation of the particular wavelength or range of wavelengths;
    a cover glass disposed over the optoelectronic device, wherein the cover glass is transparent to the particular wavelength or range of wavelengths;
    one or more passive optical elements disposed in a holder having a base that sits directly on the cover glass;
    a spacer laterally surrounding and encapsulating an edge of the cover glass;
    a first flange on the holder and a second flange on the spacer, the first flange projecting outwardly in a first direction away from the one or more passive optical elements to provide a first protruding portion, the second flange projecting inwardly in a second direction toward the one or more passive optical elements to provide a second protruding portion,
    wherein the first flange has at least one first groove in the first protruding portion,
    wherein the second flange has at least one second groove in the second protruding portion, and
    wherein adhesive is present on the first and second flanges, including in the at least one first groove and the at least one second groove, and on a portion of the holder and a portion of the spacer adjacent to the at least one first groove and at least one second groove, which fixes the holder to the spacer.

12. The optoelectronic module of claim 11 wherein at least one of the first or second flanges includes one or more grooves.

13. The optoelectronic module of claim 11 wherein the first flange is contiguous with the holder.

14. The optoelectronic module of claim 13 wherein the first flange includes one or more grooves along its edge.

15. The optoelectronic module of claim 11 wherein the holder is a lens barrel, and wherein the one or more passive optical elements include a lens.

16. The optoelectronic module of claim 11 wherein the second flange is contiguous with the spacer.

17. The optoelectronic module of claim 16 wherein the second flange includes one or more grooves along its edge.

18. The optoelectronic module of claim 11 wherein at least one of the first or second flanges is composed of a material that is opaque to the particular wavelength or range of wavelengths.

19. The optoelectronic module of claim 11 wherein:
    the optoelectronic device includes an image sensor,
    the spacer includes a vertical alignment feature that separates the cover glass from the image sensor, and the vertical alignment feature sits directly on the image sensor.

20. The optoelectronic module of claim 11, wherein
the optoelectronic device includes a light emitter on a sub-mount sub-assembly,
the spacer includes a vertical alignment feature that separates the cover glass from the light emitter, and
the vertical alignment feature sits directly on a portion of the sub-mount sub-assembly without intervening adhesive.

21. The optoelectronic module of claim 11, wherein the holder and the spacer are non-contiguous.

22. The optoelectronic module of claim 11, wherein the holder and the spacer have a longitudinal axis along the main optical axis of the one or more passive optical elements and have an area of overlap in the longitudinal direction; and wherein the holder and the spacer define an annulus extending along said area of overlap.

* * * * *